Oct. 9, 1945.    A. MOESSINGER    2,386,706
CENTRAL SAFETY DEVICE
Filed March 15, 1943    2 Sheets-Sheet 1
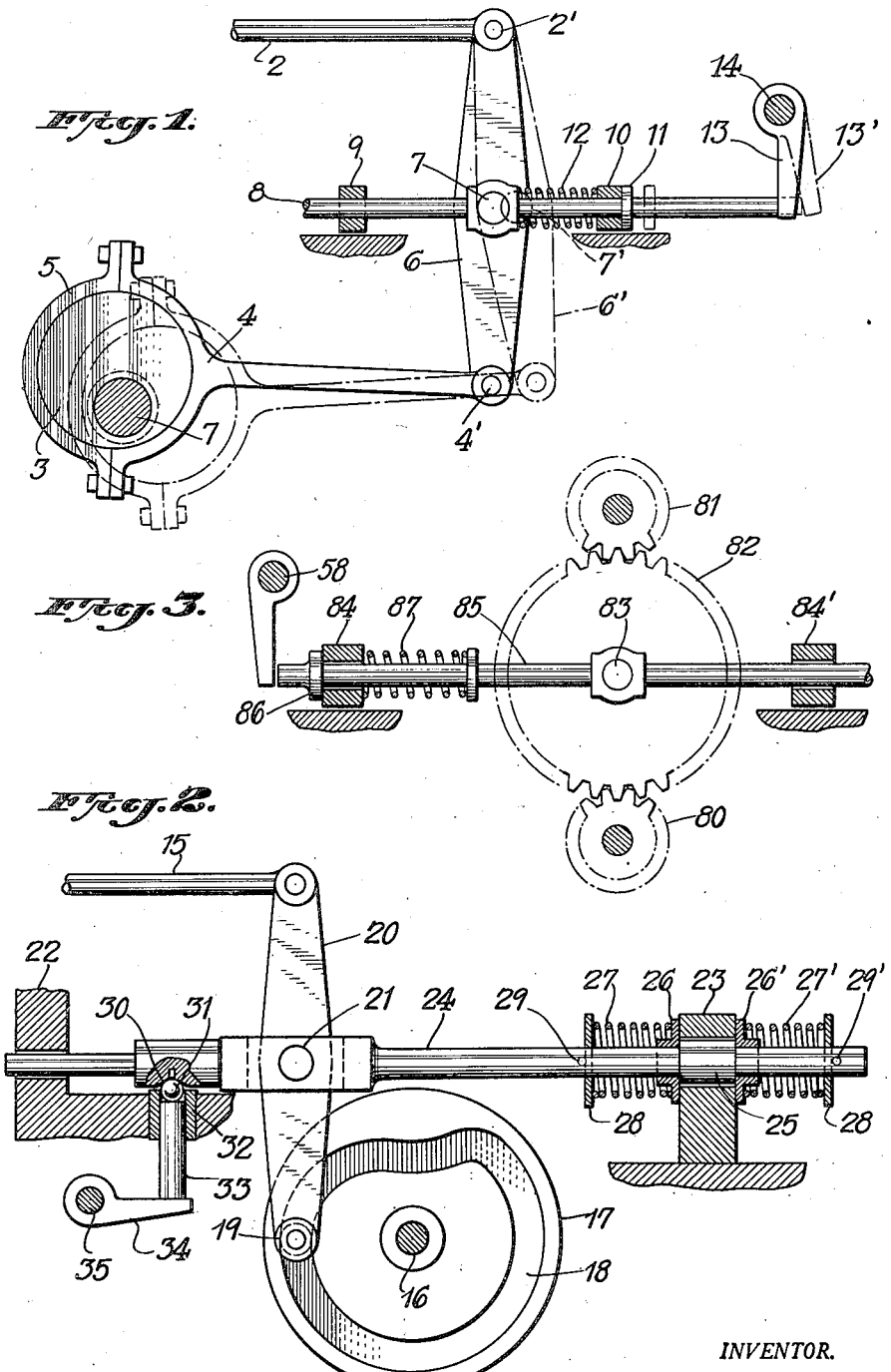
INVENTOR.
ALBERT MOESSINGER.
BY
ATTORNEY.

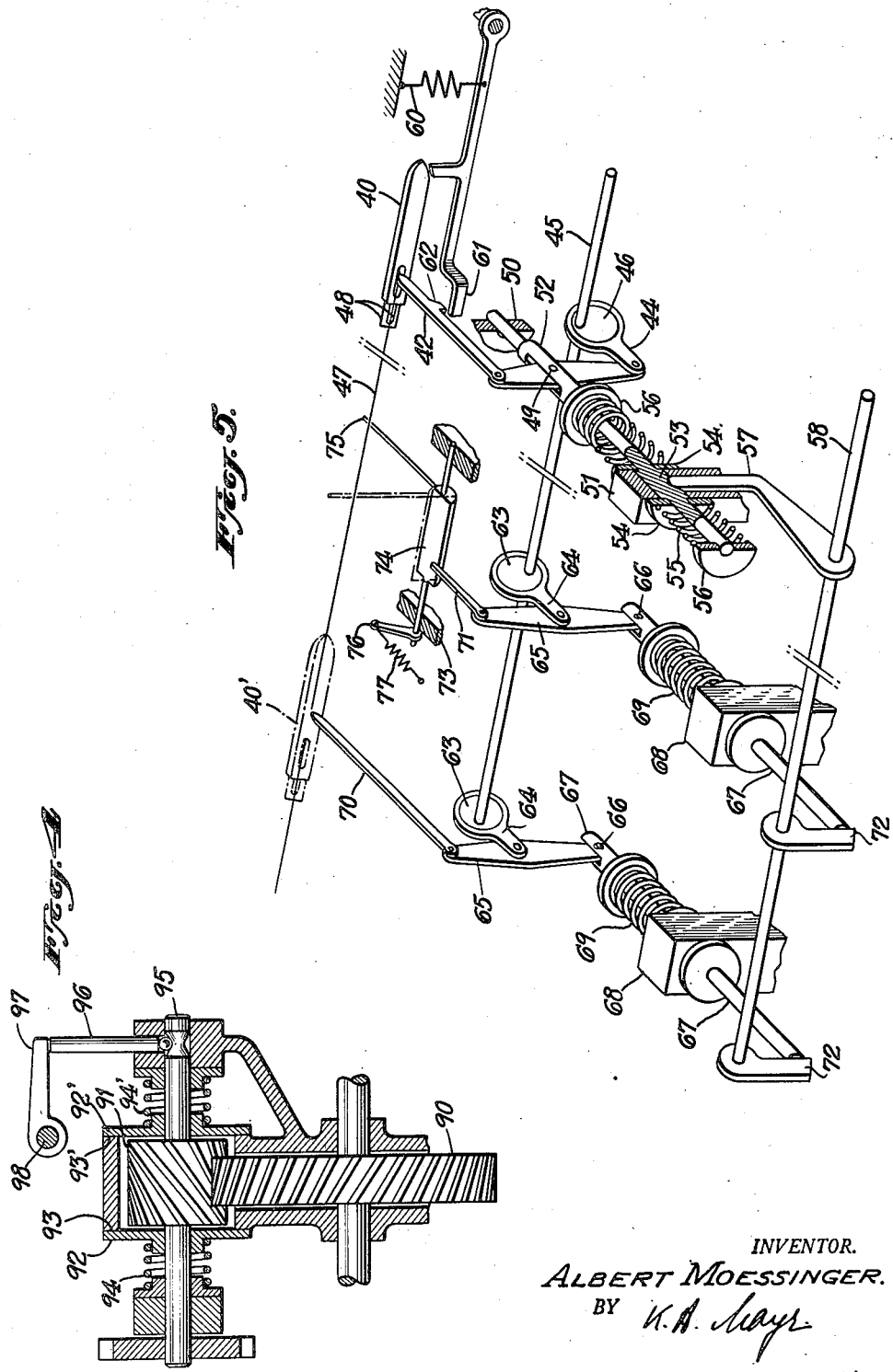

Patented Oct. 9, 1945

2,386,706

UNITED STATES PATENT OFFICE 2,386,706

CENTRAL SAFETY DEVICE

Albert Moessinger, Winterthur, Switzerland, assignor to Sulzer Frères, Societe Anonyme, Winterthur, Switzerland Application March 15, 1943, Serial No. 479,232
In Switzerland April 1, 1942

8 Claims. (Cl. 74—47)

In elements transmitting motion, especially in devices where the parts are not positively connected to each other, for instance in looms with ordinary shuttles, it is possible that the working parts may become blocked through the inaccurate working of the shuttles, for instance coming to rest in an undesired position. In order to avoid the possibility of these parts becoming blocked, the elements are constructed in a known manner so that the force in the direction of the endangered motion acts through a spring. In order, however, to obtain sufficient accuracy in working, this spring force should not be greater than the greatest force acting on the driven part during normal working. This leads to unnecessary wear and too much power being required by the machine.

The invention eliminates this drawback and consists in that a pivot point in an element transmitting motion is normally held stationary in its working position by a spring against a fixed stop, so that, when the driven part of this element is for some reason or other unable any longer to execute its motion, the normally stationary pivot point is moved from its usual position by the further motion of the driven part of the element.

The motion of the pivot point normally held in a stationary position by springs, can act on the stopping device of the machine through a transmission linkage. When several such safety devices are incorporated in the same machine, it will be found preferable for the motions of the spring-supported pivot points to act on one and the same shaft extending along the machine and connected to the stopping motion of the machine. The spring-supported pivot points may move parallel to or normally to the plane of motion in case of a disturbance.

Various examples of execution of the subject matter of the invention are shown diagrammatically in the drawings.

Figs. 1–4 represent safety devices for elements transmitting motion.

Fig. 5 represents axonometrically a central safety installation for a loom with ordinary shuttles.

Fig. 1 shows a shaft 1 driven by the machine, from which shaft a motion has to be transmitted to the rod 2. An eccentric 3 is keyed on the shaft 1 and is attached by the eccentric strap 5 to the connecting rod 4. This connecting rod 4 is connected by the rocking lever or supportable member 6 to the rod 2. The middle pivot pin 7 of the rocking lever 6 is fixed to a rod 8 which can slide axially in the bearings 9 and 10 rigidly connected to the fixed part of the machine. Members 7 and 8 movably support to supportable member 6. The rod 8 is provided with a collar or an abuttal 11 which is pressed against the fixed bearing or stationary abutment 10 by the action of the spring 12.

As long as the machine works free from trouble, the bearing pin 7 remains in the position shown in full lines and the lever 6 rocks about the pivot 7. Should for any reason the rod 2 be prevented from executing its motion, the lever 6 will be brought into the position 6' (shown in chain-dotted lines) because of the further motion of the eccentric 3 and the connecting rod 4, the bearing pin 7 and the rod 8 making a motion to the right until the bearing pin comes into the position 7'. The rod 8 presses on an actuating mechanism comprising a lever 13 connected to the control shaft 14, which causes the machine to stop when the lever comes into the position 13' shown by the dotted line.

Fig. 2 illustrates a similar system in which, however, the rod 24 can be prevented from moving in either direction. On a shaft 16 driven by the machine is keyed a cam 17. In the cam curve 18 of the cam 17 runs a roller 19 which is pivotally supported on the end of the rocking lever 20. At the other end of this rocking lever 20 the rod 15 is fixed. The middle pivot 21 of the rocking lever 20 is located in a rod 24 which is supported by bearings 22, 23 connected to the stationary part of the machine.

The rod 24 has a thickened part 25 which is exactly as long as the bearing 23. By means of the spring plates 26 and 26', and the springs 27 and 27' connected to the rod 24 by the spring plates 28, 28' and the pins 29, 29', the rod 24 is held in a certain position. Thereby also the pivot points 21 of the rocking lever 20 have a certain definite position. If for any reason the rod 15 cannot execute its motion, the pivot point of the rocking lever 20 will be able to move according to the invention to the right or to the left by overcoming the force of the spring 27 or 27', according to the direction in which the motion of the rod 15 is prevented.

In the rod 24 is also a funnel-shaped recess 30 in which a ball 31, which is movably held in a guide bush 32 connected to the fixed part of the machine, is pressed upwards by a rod 33, a control lever 34 and a control shaft 35. When the rod 24 is moved to the right or to the left, the ball 31 is pressed downwards, thus influencing the control lever 35 together through the rod 33 and the lever 34.

Fig. 3 shows a safety device for a motion transmitted by toothed wheels. The motion is transmitted from the driving wheel 80 to the driven wheel 81 through an intermediate wheel 82, whose axis 83 is supported on a shaft 85 carried in two fixed bearings 84 and 84'.

The rod 85 has, similarly to the arrangement shown in Fig. 1, a collar 86 which is pressed onto the fixed bearing 84 by a spring 87. Should for some reason or other the driven wheel 81 not be able to make its rotation, the point of rotation 83 of the intermediate wheel 82 will be moved to the left against the action of the spring 87 because of the further movement of the driving toothed wheel 80, so that the machine is brought to rest by the control shaft 58.

Fig. 4 illustrates a further example of execution according to the invention, in which the motion is transmitted by helical toothed wheels. The axis of one of the two wheels 90 and 91 is kept in position axially by two disks 92 and 92'. These two disks are pressed onto a fixed stop 93, 93' by means of springs 94 and 94', which stop is longer than the toothed wheel 91 by the play required to ensure the machine running correctly.

In normal service these disks 92, 92' are to be regarded as fixed disks. But if the torque to be transmitted should increase for any reason beyond a certain permissible value, the axial reactions caused by the helical gearing become greater than the pressure exerted by the springs 94, 94'. The toothed wheel 91 and its axis 95 are moved axially, thus causing the machine to stop by influencing the linkage 96, 97 and the control shaft 98.

Fig. 5 shows axonometrically a central safety installation for a loom with gripper shuttles. The shuttle 40 is brought to rest by brakes (not shown in the drawings) in its position shown in full lines. In this position the weft thread 41 inserted by the shuttle is to be freed. For this purpose a rod 42 is provided which is operated by the rocking lever 43, the connecting rod 44 and the eccentric 46 keyed to the driving shaft 45. The rod 42 enters an opening 47 in the shuttle 40 and forces the two gripping cheeks of the thread gripper 48 apart. The weft thread 41 is thereby freed from the shuttle.

The pivot point 49 of the lever 43 is carried on a rod 52 which is movable in the bearings 50 and 51 and can execute an axial movement. The rod 52 has a thickened part 53 which is exactly as long as the bearing 51 and lies within that bearing. By means of the loose spring-plates 54 and the spring 55, which are connected to the rod 52 through the fixed spring-plate 56, the rod 52 is kept fixed in a certain position.

The device works in the same manner as already shown in Fig. 2. Through a displacement of the rod 52, the lever 57 is caused to make a slight motion downwards and turn the shaft 58. If the shuttle 40 has not reached its proper position, for instance if it has not come sufficiently far into the brake, the opening 47 will no longer be in the proper position to allow the rod 42 to enter it. The rod 42 will therefore hit against the body of the shuttle. But by the further movement of the connecting rod 44 and the locking of the rod 42, the pivot point 49 of the lever 43, and consequently the rod 52, will be moved to the front, i. e. in the direction of the control shaft 58, whereby the lever 57 and the shaft 58 will be turned, thus stopping the machine.

If the shuttle 40 does not come into the brake at all, the extension 61 of the lever 59, which is pulled upwards by a spring 60 into the path of the shuttle, will come into the way of a hook 62 provided on the rod 42, thus preventing the rod 42 from moving towards the front. Because of the further motion of the connecting rod 44, which is driven by the driving shaft 45, the pivot point 49 of the lever 44 is moved towards the rear, whereby also the lever 57 and the control shaft 58 are rotated and the machine is stopped. If on the other hand the shuttle has come into its proper position, the point of the shuttle 40 presses against the lever 59 and brings the extension 61 of the lever 59 beyond reach of hook 62.

On the driving shaft 45 two further eccentrics 63 are provided. These eccentrics drive two connecting rods 64, each of which is connected to a lever 65. The lower pivot point 66 of the lever 65 is carried in a rod 67. This rod is movable in the bearing 68 and is pressed against that bearing by the spring 69, so that the rod has a definite position in normal service. This device works in the same manner as the one shown in Fig. 1. By the motion of the connecting rod 64, the lever 65 moves the rod 70 and/or 71 backwards and forwards. The rod 70 after the picking time enters a hole (not shown) in the shuttle. The shuttle 40' is shown in chain-dotted lines in that position.

If the shuttle 40' has not been picked because of incorrect working of the machine, the rod 70 presses against the shuttle and its motion is thereby blocked. Through the further motion of the connecting rod 64 the pivot point 66 of the lever 65 is moved against the force of the spring 69, whereby the rod 67 rotates the lever 72 and the control shaft 58.

The rod 71 of the central part of the installation is designed as a weft stop motion. In the fixed bearings 73 a member 74 is pivotally supported. This member carries a feeler needle 75 and a lever arm 76, the latter tending to rotate the member 74 by a spring 77. This rotation is hindered by the taut weft thread 41. In this position the rod 71 can slide over the member 74 without hindrance. If the thread 41 breaks, the feeler needle can turn into the chain-dotted position shown, the member 74 being rotated under the influence of the spring 77. In that position the member 74 presents a surface in the path of the rod 71, thus blocking its motion and the machine is consequently stopped in a similar manner as for the needle 70.

Preferably all the safety devices for the machine are constructed in such a way that they can act on the same control shaft 58 installed alongside the machine. The control shaft 58 is connected to a stopping device of the loom which is not shown in the drawings. The elements which constitute this safety device may be made all of the same size for adopting in any case, so that their manufacture is rendered inexpensive.

According to the invention the bearing pressures of the members transmitting the motion in normal service are the same as in a positively-driven system. But should any disturbance occur, the forces thereby exerted are limited by the spring pressure of the yieldingly supported pivot point of the moving element, thereby preventing any breakage or other damage to the device.

I claim:

1. A motion transmitting mechanism comprising a supportable member and movable support means movably connected therewith, a stationary abutment means slidably connected with said support means, an abuttal connected with said support means and abutting said abutment means when said support means are in normal operating position, resilient means interposed between said abutment means and said support means and adapted to hold said support means in position whereby abutting relation between said abutment means and said abuttal and normal operating position of said support means are assured and adapted to yield to an abnormal pressure exerted by said supportable member on said movable support means whereby said support means are moved and said abuttal is removed from said abutment means.

2. A motion transmitting mechanism comprising a supportable member, a stationary abutment, a longitudinally movable, shaft-like support member extending through said abutment and swingably supporting said supportable member, an abuttal on said shaft-like member on either side of said abutment, and spring means disposed on either side of said abutment and individually interposed therebetween and one of said abuttals.

3. A mechanism as set forth in claim 1, comprising an actuating mechanism in operative relation with said movable support means and adapted to be operated upon movement of said support means.

4. A mechanism comprising a plurality of motion transmitting mechanisms of the type set forth in claim 1, and an actuating mechanism having members individually adjacent to and in operative relation with the movable support means of said motion transmitting mechanisms, said actuating mechanism being operated upon movement of any one of said support means.

5. A motion transmitting mechanism comprising a supportable member having a fulcrum, a longitudinally displaceable longitudinal support member swingably connected with said supportable member at its fulcrum, yielding means connected with and holding said support member and said fulcrum in normal operating position, and actuating means movably connected with said support member and being actuated by a longitudinal movement thereof and displacement of said fulcrum against the action of said yielding means.

6. A motion transmitting mechanism comprising, in combination, a plurality of supportable members and a plurality of longitudinally displaceable longitudinal support members individually movably connected therewith, yielding means connected with and individually holding said support members in normal operating position, and a plurality of abutment members individually abuttingly engaging said individual support members and being adapted to be individually actuated by a longitudinal movement of an individual support member against the action of the yielding means pertaining thereto, and an actuating means connected with all of said abutment members and being actuated upon movement of any one of them.

7. A motion transmitting mechanism as set forth in claim 5, said actuating means having a portion moving, when actuated, substantially in the same direction as said longitudinal movement.

8. A motion transmitting mechanism as set forth in claim 5, said actuating means having a part moving, when actuated, substantially at a right angle with respect to the direction of said longitudinal movement.

ALBERT MOESSINGER.